United States Patent [19]

Haslim

[11] Patent Number: 4,736,932

[45] Date of Patent: Apr. 12, 1988

[54] SEGMENTED TUBULAR CUSHION SPRINGS AND SPRING ASSEMBLY

[75] Inventor: Leonard A. Haslim, Hayward, Calif.

[73] Assignee: The United States of America as represented by the Administrator of the National Aeronautics and Space Administration, Washington, D.C.

[21] Appl. No.: 746,180

[22] Filed: Jun. 18, 1985

[51] Int. Cl.⁴ .............................................. B60G 11/52
[52] U.S. Cl. ........................................ 188/83; 267/42; 267/133; 267/142; 248/626; 5/247
[58] Field of Search ................ 267/80, 81, 83, 85, 267/103, 105, 106, 160, 164, 181, 148, 149, 142, 146, 42, 43, 130, 133; 297/455, 456; 248/626, 627; 5/247, 255

[56] References Cited

U.S. PATENT DOCUMENTS

| 143,086 | 9/1873 | Likes | 248/626 |
|---|---|---|---|
| 1,153,058 | 9/1915 | Gilfillan | 248/627 X |
| 1,839,656 | 1/1932 | Dorton | 5/247 |
| 1,916,056 | 6/1933 | Lampaugh | 267/83 |
| 3,618,144 | 11/1971 | Frey et al. | 267/142 X |

FOREIGN PATENT DOCUMENTS

| 511320 | 3/1955 | Canada | 297/456 |
|---|---|---|---|
| 0077941 | 5/1983 | Japan | 267/149 |

Primary Examiner—George E. A. Halvosa
Assistant Examiner—Matthew C. Graham

[57] ABSTRACT

A spring (10) includes a tube (12) having an elliptical cross section, with the greater axial dimension (22) extending laterally and the lesser axial dimension (24) extending vertically. A plurality of cuts (20) in the form of slots passing through most of a wall of the tube (12) extend perpendicularly to a longitudinal axis (16) extending along the tube (12). An uncut portion (26) of the tube wall extends along the tube (12) for bonding or fastening the tube to a suitable base, such as a bottom (28) of a seat cushion (30).

8 Claims, 8 Drawing Sheets

SEGMENTED TUBULAR CUSHION SPRINGS AND SPRING ASSEMBLY

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

1. Field of the Invention

This invention pertains to a novel tubular spring and to an assembly formed from the tubular spring which permits the fabrication of lightweight cushions with improved mechanical and fire resistant characteristics. Further, it simplifies the construction of and reduces the cost of spring-containing cushions. The invention is particularly useful in vehicle seating and furniture, such as aircraft and surface transportation seats, crashworthy seats, upholstered chairs, sofas, davenports, lounges, mattresses, exercise mats, mats used to line confinement cells, shipping containers, and other places where a shock-absorbing cushion is needed, and related articles.

2. Description of the Prior Art

A wide variety of spring and seat cushion assemblies incorporating different spring designs are known in the art. Many proposals have been made over the years to simplify seat and related cushion design using alternatives to conventional coil springs. For example, the following issued U.S. patents disclose such spring and cushion designs: U.S. Pat. Nos. 359,070, issued Mar. 8, 1887 to Goewey; 1,266,359, issued May 14, 1918 to Vining; 1,579,074 issued Mar. 30, 1926 to Burton; 1,814,789, issued July 14, 1931 to Dorton; 1,839,656, issued Jan. 5, 1932 to Dorton; 2,202,630, issued May 28, 1940 to Hauber; 2,277,853, issued Mar. 31, 1942 to Kohn; 2,321,790, issued June 15, 1943 to Bass; 2,856,988, issued Oct. 21, 1958 to Herider et al.; 3,167,353, issued Jan. 26, 1965 to Crane; 3,618,144, issued Nov. 9, 1971 to Frey et al.; 3,869,739, issued Mar. 11, 1975 to Klein; 4,059,306 issued Nov. 22, 1977 to Harder, Jr.; 4,060,280, issued Nov. 29, 1977 to Van Log; 4,079,994, issued Mar. 21, 1978 to Kehl; 4,109,959, issued Aug. 29, 1978 to Barecki et al.; 4,147,336, issued Apr. 3, 1979 to Yamawaki et al. 4,171,125, issued Oct. 16, 1979 to Griffiths; 4,174,420, issued Nov. 13, 1979 to Anolick et al.; 4,254,177, issued Mar. 3, 1981 to Eulmer; 4,294,489, issued Oct. 13, 1981 to Anolick et al.; 4,429,427, issued Feb. 7, 1984 to Sklar; 4,502,731 issued Mar. 5, 1985 to Snider.

For the reason of cost, flexible polyurethane foam has been widely employed in cushions used in vehicles and furniture. Many aircraft seat cushions, for example, simply comprise a two-pound slab of polyurethane foam covered with a decorative fabric. When an aircraft cabin containing such cushions is subjected to a fire, the foam is easily ignited with a low power energy source, and when ignited it will sustain flame propagation even after removal of the energy source. The flammable and toxic vapors produced by thermal decomposition of the foam create a very hostile environment for passengers. Even when the polyurethane foam is treated with fire retardants, application of a sustained heating rate of approximately 5 watts/cm$^2$ to one polyurethane foam seat of a multiple-seat array will produce flame spread and ignition to the adjacent seats in less than one minute. This results in sufficient fire growth to permit flames to inpinge on the aircraft ceiling in less than two minutes. The combustion products of conventional polyurethane foam padding include cyanide gas. This toxic gas induces convulsive reactions that restrict coherent motor responses in the victims, and can rapidly cause death. In addition, the vision obscuring associated smoke can have an adverse impact on any emergency procedures being taken in the aircraft cabin. Further, the accompanying flames will raise the local temperature very quickly to a dangerous level. Less flammable foams have been discovered, but they have not been accepted by the aircraft industry because, for the main reason, they have been unduly heavy (not cost effective in view of the high price of aircraft fuel). In contrast, as will be seen below, cushions made in accordance with this invention have a majority of the volume of the enclosed spaces comprised of harmless air, as opposed to the typical foam filled cushions. The cushions of this invention thus possess far less flammability hazard potential than do those in current usage. Examples of cushion designs representing an alternative to polyurethane foam cushions are found in the following issued U.S. patents: U.S. Pat. Nos. 3,374,032, issued Mar. 19, 1968 to Del Giudice; 3,518,156, issued June 30, 1970 to Windecker; 3,647,609, issued Mar. 7, 1972 to Cyba; 3,833,259, issued Sep. 3, 1974 to Pershing; 3,887,735, issued June 8, 1975 to Laberinil; 4,031,579, issued June 28, 1977 to Larned; and 4,092,552, issued June 6, 1978 to Dougan. Commonly owned 4,463,465, issued Aug. 7, 1984 to Parker et al, discloses a polyurethane seat cushion which is partially covered with a matrix that catalytically cracks flammable gases given off by the polyurethane to less flammable species.

Despite the fact that the art relating to spring and cushion design is a well developed, there exists a need for further improvements in these designs, to simply fabrication, improve cost effectiveness and mechanical characteristics, and to reduce weight and potential hazards from fire.

SUMMARY OF THE INVENTION

Accordingly, it is an object of this invention to provide a one piece spring of simplified construction having improved performance characteristics.

It is another object of the invention to provide a spring apparatus having tailorable shock absorption characteristics.

It is a further object of the invention to provide a comfortable, lightweight, cost-effective alternative to the flexible polyurethane foam cushion.

It is still another object of the invention to provide a durable cushion capable of withstanding repeated flexions and which has materials that will generate a minimum of toxic gases when exposed to fire.

It is yet another object of the invention to provide a cushion that is suitable for use in subways, mass transit, automobiles, aircraft and other vehicles, as well as chairs, couches, mattresses, and other forms of furniture.

The attainment of these and related objects may be achieved through use of the novel spring and cushion assembly incorporating the spring herein disclosed. A spring in accordance with this invention comprises a tube having a cross section with laterally extending horizontal axis of greater dimension than its vertical cross section axis, e.g., an elliptical cross section, with the greater axial dimension extending laterally and the lesser axial dimension extending vertically. A plurality of cuts in the form of slots passing through most of a wall of the tube extend at an angle, e.g. perpendicularly, to a longitudinal axis extending along the tube. An uncut portion of the tube wall extends along the tube for bonding or fastening the tube to a suitable base member.

A spring assembly in accordance with the invention includes a plurality of the springs in accordance with the invention attached in rows by means of the uncut portion to a base member. When implemented as part of a seat cushion, each spring in the assembly desirably extends all the way across the seat cushion.

The spring tube may be fabricated of any suitable spring material, for example, a resin impregnated reinforcing fabric composite or sheet metal. The springs occupy only a small fraction of the volume taken up, for example, by a two-pound slab of flexible polyurethane foam, the amount of foam used in some aircraft seat cushions. Further, the springs may be fabricated from materials that do not pose a smoke or toxic gas hazard when exposed to fire.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
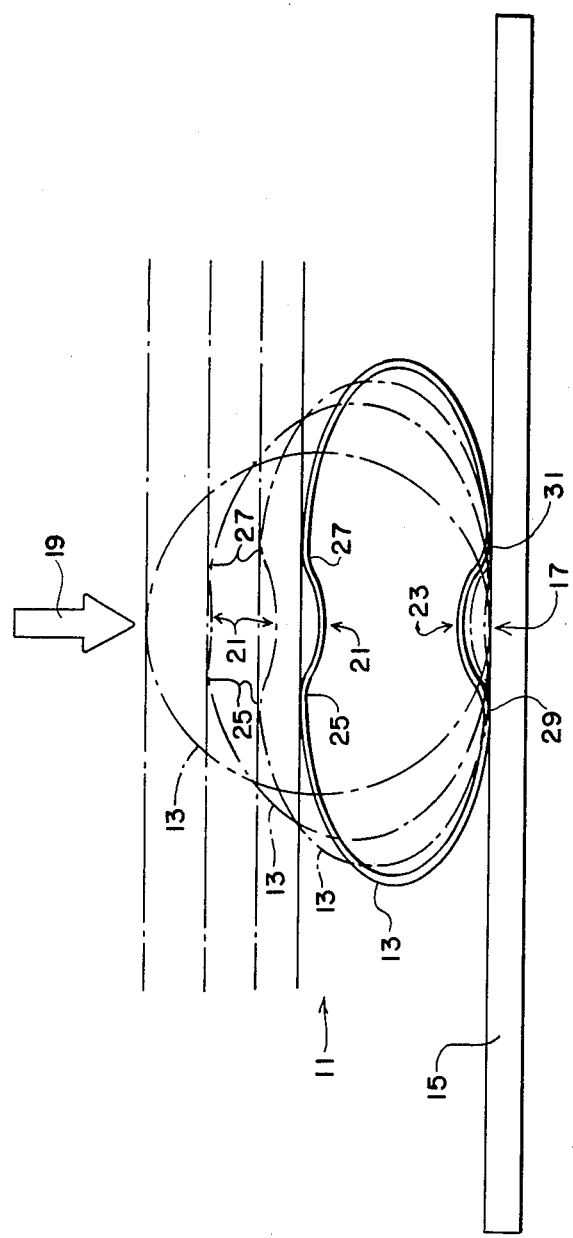
FIG. 1 is a cross section view of a prior art spring.

Turning now to the drawings, more particularly to FIG. 1, there is shown a prior art spring assembly 11, useful for understanding advantages of the present invention. The assembly 11 includes a tubular spring 13 having a circular cross section and attached to a suitable support 15 at 17, such as by means of an adhesive or rivets. The spring 13 is shown in its sequential positions as a successively greater downward force is applied to it, as indicated by the arrow 19, until it compresses to reach a final position, shown in solid line. As is shown at 21 and 23 in each successive position of the spring 13, the spring 13 bows as it compresses, both at the top and at the bottom of the spring. Other than a tendency to produce fatigue in the spring at points 25 and 27 as the spring 13 compresses, the bowing at 21 presents no particular problem. However, the bowing at 23, in addition to promoting fatigue at points 29 and 31, presents a more serious problem, because it occurs at the place 17 where the spring 13 is attached to the support 15. If attached by means of an adhesive, separation of the spring from the support may occur. Adhesives have a substantial lateral shear strength, but significantly less resistance normal to an attached surface. Therefore, the bowing shown at 23 may separate the spring from the support 15. Similarly, if a rivet or other fastener is used to attach the spring 13 to the support 15, the spring 13 will tend to pull away from the rivet, and will actually separate after the spring has been sufficiently fatigued by the bowing. These and related problems limit the use of such circular cross section tubular springs.

Figure 3:
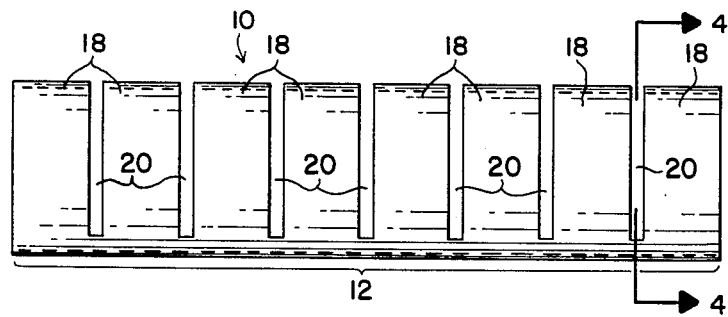
FIG. 3 is a side view of the spring shown in FIG. 2.
Figure 4:
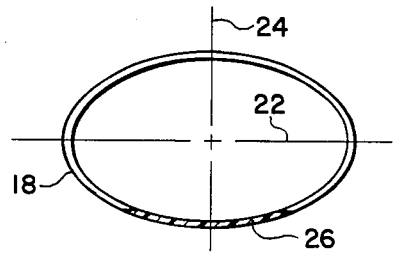
FIG. 4 is a cross section view of the spring shown in FIGS. 2 and 3, taken along the line 4—4 in FIG. 3.
Figure 2:
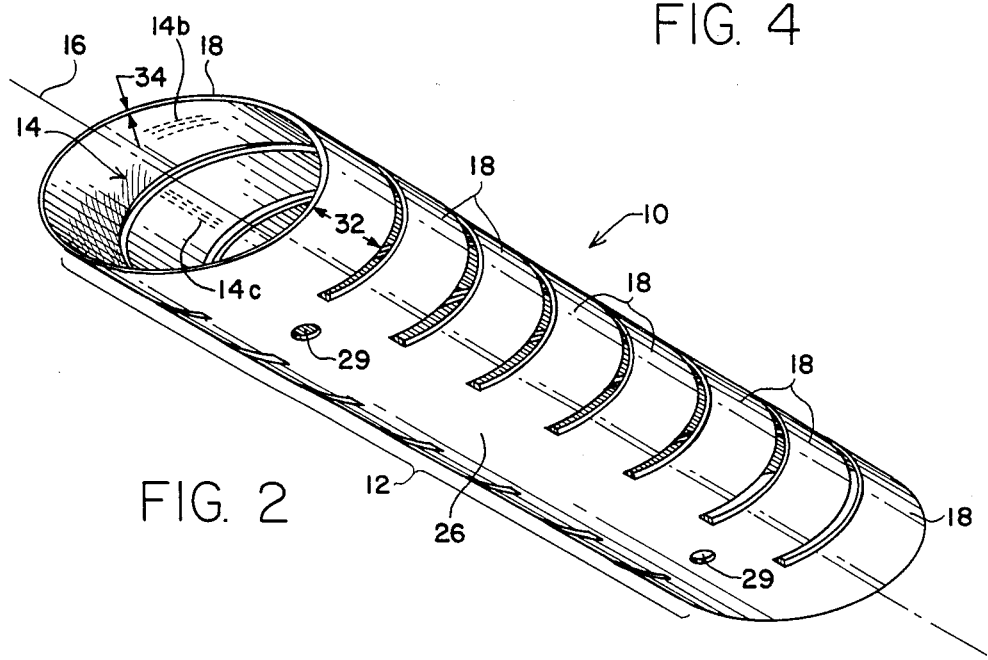
FIG. 2 is a perspective view of a spring in accordance with the invention.

Turning now to FIGS. 2-4, there is shown a spring 10 in accordance with the invention. The spring 10 consists of a tube 12, which may be formed from a suitable spring metal, such as steel, or in a preferred form of the invention as shown in FIGS. 2-4, from a cured, resin-impregnated fabric reinforced composite. Suitable resins for fabricating the composites are aerospace-grade epoxy resins, some of which comprise diglycidyl ether epoxy resins cured with diaminodiphenylsulfone (DDS). Suitable aerospace-grade resins include: 934 (Fiberite), MY720 (Ciba-Geigy), 3501 (Hercules), and 5208 (Narmco). The following commonly owned U.S. patent applications disclose resin-impregnated fiber reinforced composites with low cure temperatures (permitting hot melts) and greatly improved mechanical (shear strength, flexural strength, modulus, etc.) and fire-resistant properties: Vinyl Styrylpyridines and their Copolymerization with Bismaleimide Resins, Ser. No. 553,339, filed Nov. 18, 1983; and High Performance Mixed Bismide Resins and Composites Based Thereon, Ser. No. 719,796, filed Apr. 4, 1985.

Figure 5:
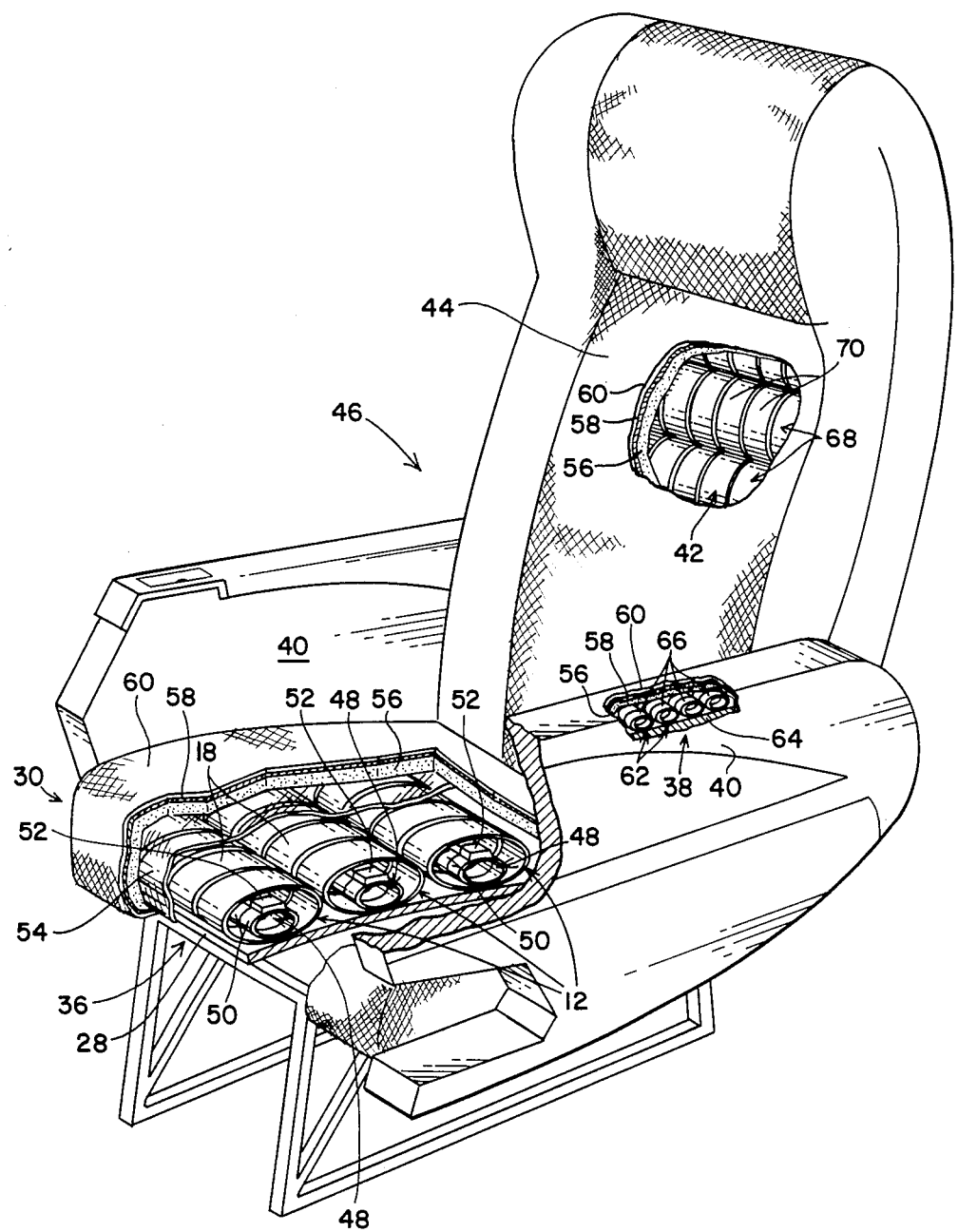
FIG. 5 is a perspective view of an airplane seat incorporating springs as shown in FIGS. 2-4, with partial cutaways to show interior detail.

When the tubes are formed from a composite, at least some of the fibers 14b of the reinforcing fabric are preferably oriented normal to axis 16 of the tube 12, i.e., the fibers are oriented circumferentially. Further along there is a detailed discussion of fiber orientation and an angular reference scheme is utilized, wherein 0° refers to a line or plane normal to longitudinal axis 16. Under that scheme, the cross section of FIG. 4 has an angle of 0°. The fibers 14 and 14c called out in FIG. 2 have an approximately 45° and an approximately 90° orientation, respectively. These orientations are not optimum for the elliptical hoop flexural strength, as will be explained later, but do contribute to the required strength in the tubular or longitudinal direction necessary to maintain unit integrity. Thus, the tube 12 is formed from a plurality of plies having the different fiber orientations shown at 14, 14b and 14c. As shown, the tube 12 has an elliptical cross section, with the laterally extending axis 22 of the ellipse having a greater size than the vertically extending axis 24. If desired, the tube 12 could have a different, non-elliptical shape, but the axes 22 and 24 should have the same size relationship, i.e., the axis 22 should be larger than the axis 24. As is best shown in FIGS. 2 and 3, the tube 12 is cut most of the way through on planes perpendicular to the cylindrical axis 16 to define a plurality of hoops 18 along the tube 12. Although the cuts 20 are shown perpendicular to the axis 16, it should be understood that another angular relationship between the cuts 20 and the axis 16 could be employed, for example, an acute angle. Hoops 18 are formed as a result of cuts or slots 20. Each hoop 18 may depress independently of the hoop adjacent thereto. Thus, the hoops 18 will tend to be depressed an amount proportional to the load on each one and the spring will readily accomodate a large variety of loads—loads that vary in shape as well as force distribution. Strip 26 of the tube 12 not cut through holds the hoops 18 together and serves as an attachment pad for bonding or fastening the hoops 18 to a suitable base, such as base 28 of seat cushion 30 (FIG. 5). A plurality of optional openings 29 are provided through the strip 26 for use when fasteners are employed to attach the tube 12 to the support.

The spring characteristics of the hoops 18 can be varied by varying the width 32 of the hoops, as well as thickness 34 of the tube 12 wall and the material from which the tube 12 is fabricated. The overall spring characteristic of the tube 12 can also be varied by changing the width and depth of the cuts 20.

Fabrication of tubes 12 shown in FIGS. 2-4 from a composite material is a simple process. It may be accomplished by wrapping plies of a resin-impregnated reinforcing fabric (prepreg) around a mandrel of the desired elliptical cross section and then curing the prepregs. Another method by which these tubes 12 may be formed from the composite material is by utilizing a process known in the industry as pultruding (a combination extruding/pulling process), employing a suitably sized elliptical die and mandrel. After the prepregs are extruded/pulled through the mandrel they are cured in a conventional manner. When the tube 12 is fabricated from metal, it can be made by simply rolling up a metal sheet and leaving the inner and outer edges loose in overlapping relationship (that is, not welded, soldered, or otherwise seamed). The tube 12 could also be made from thin-walled steel tubing that is first annealed, then formed to the elliptical shape, then cut, and finally retempered to restore springiness.

FIG. 5 shows how the tubes 12 are incorporated in an assembly 36 in seat cushion 30, an assembly 38 in arm 40, and an assembly 42 in back 44 of an aircraft seat 46. As shown, the assembly 36 consists of the tubes 12 arranged in rows and bonded or adhesively fastened by means of the strips 26 (FIGS. 2 and 4) to base 28. Base 28 serves to reduce the lateral movement of one tube 12 with respect to adjacent tubes. The requirements for base 28 are somewhat dependent on the support used beneath the overall cushion assembly. In cases where the cushion support is merely three or more points or very small areas, base 28 should be a panel that will not flex (or flex greatly) under the loads anticipated on the cushion assembly. The panel may optionally have some apertures in it to further reduce its weight. On the other hand, when the cushion support is capable of adequately supporting the cushion over its entire underside area, the structural requirements for base 28 may be relaxed. Base 28 may be, for example, a lightweight, fire-resistant panel comprising a honeycomb sandwich (wherein the honeycomb is metal or a fiber reinforced composite and the skins are either metal or fiber reinforced composite), a fiber reinforced composite panel, or a metal plate. A suitable fiber reinforced composite panel may be fabricated from Magnamite graphite prepreg tape AS4/3501-6 (manufactured by Hercules, Inc.) wherein the plies are arranged 0°/+ or −45°/90°. AS4/3501-6 tape is an amine-cured epoxy reinforced with unidirectional graphite filaments. The tubes 12 are cut to a suitable length so that they extend all the way across the seat cushion 30. This simplifies cushion construction by reducing the number and complexity of spring parts that have to be installed. Within each of the tubes 12 is a tube 48 comprising a line of smaller, bottoming hoop springs 50, formed in the same way as the hoops 18 cut from the tubes 12. The smaller tubes 48 can be installed inside the larger tubes 12 by bonding them in place either before or after cutting the hoops 18 and 50. Tube 48 may have a different number of slots 20 than tube 12, and the slots 20 in tube 48 may be staggered with respect to the slots 20 in tube 12. Optional resilient pads 52 may be bonded to the upper surface of hoops 50 or the under side of hoops 18 to prevent a clicking noise when a hoop 18 is pressed against its associated hoop 50. A suitable material for pads 52 is high density neoprene marketed by Toyad Corporation. The tubes 12 and 48 are enclosed in a heat sealed air bag 54 so that the seat cushion 30 can be used for flotation if the aircraft is forced to make an emergency landing in water. The air bag 54 is preferably made from a temperature-resistant polymer, such as an aromatic polyamide film marketed under the trademark Nomex ® by duPont. Among other suitable materials for the air bag is a heat sealable, self extinguishing chlorotrifluoroetylene polymer film marketed under the trademark KEL-F ® by 3M. A layer 56 of padding is provided over the air bag 54. The padding may, for example, comprise one or more of the following fire resistant felts: Nomex (duPont), Norfab ® (trademark of Amatex), PBI (polybenzimidazole), and fire-retardant wool. The air bag 54 and the padding 56 are enclosed in a fire blocking layer 58 which is preferably one or more layers of a ceramic-fiber woven fabric, such as NEXTEL ® 312, comprised of non-flammable continuous polycrystalline metal oxides ($Al_2O_3$, $B_2O_3$ and $SiO_2$), having low thermal conductivity and capable of withstanding temperature exposures in excess of 2600° F. (1427° C.), and marketed by 3M for purposes that capitalize on the fabric's flame barrier properties. Versions of NEXTEL 312 with rubberized coatings of neoprene or silicone that are char forming are especially suitable for applications here when it is desired that the fire-blocking fabric have superior abrasion resistance and function as a smoke/gas barrier. An alternate fire blocking material is a polyvinylidene fluoride film obtainable from Pennwalt Corporation under the trademark Kynar ®. A decorative upholstery fabric 60, preferably fire retarded, covers the fire blocking sheet 58.

The assembly 38 in arms 40 of the aircraft seat 46 is of similar construction. Tubes 62 are bonded or fastened to base 64 within each arm 40. Hoops 66 cut from each tube 62 are configured so that they will deform with less pressure than the hoops 18 and 50 in the assembly 36. This may be achieved by making the tubes 62 with thinner walls than the tubes 12 and 48 and by making the hoops 66 with a narrower width than the hoops 18 and 50. A similar assembly 42 in back 44 of the seat 46 includes tubes 68 cut to form hoops 70, intermediate in resiliency between the hoops 18 and the hoops 66. The padding 56, fire blocking layer 58 and upholstery fabric 60 are also provided over the assemblies 38 and 42.

After a person removes his weight from a polyurethane foam seat cushion, the foam recovers its original shape very slowly. Stating it another way, the foam tends to crush or bunch up, and becomes more difficult to endure as the duration of seating lengthens. The rebound resiliency of polyurethane foam as used is fixed and uniform, typically about 38% (by the Lupke pendulum method). In contradistinction, the rebound resiliency of the subject cushion can readily be made greater than that of polyurethane foam and can be selected to meet a particular load and load distribution. The invention provides a live and springy cushion of enduring comfort.

Thus, aircraft seat 46 provides a more comfortable feel than a polyurethane foam padded seat, is lightweight and simple to fabricate and obviates the smoke and toxic gas problems associated with polyurethane.

Figure 6:
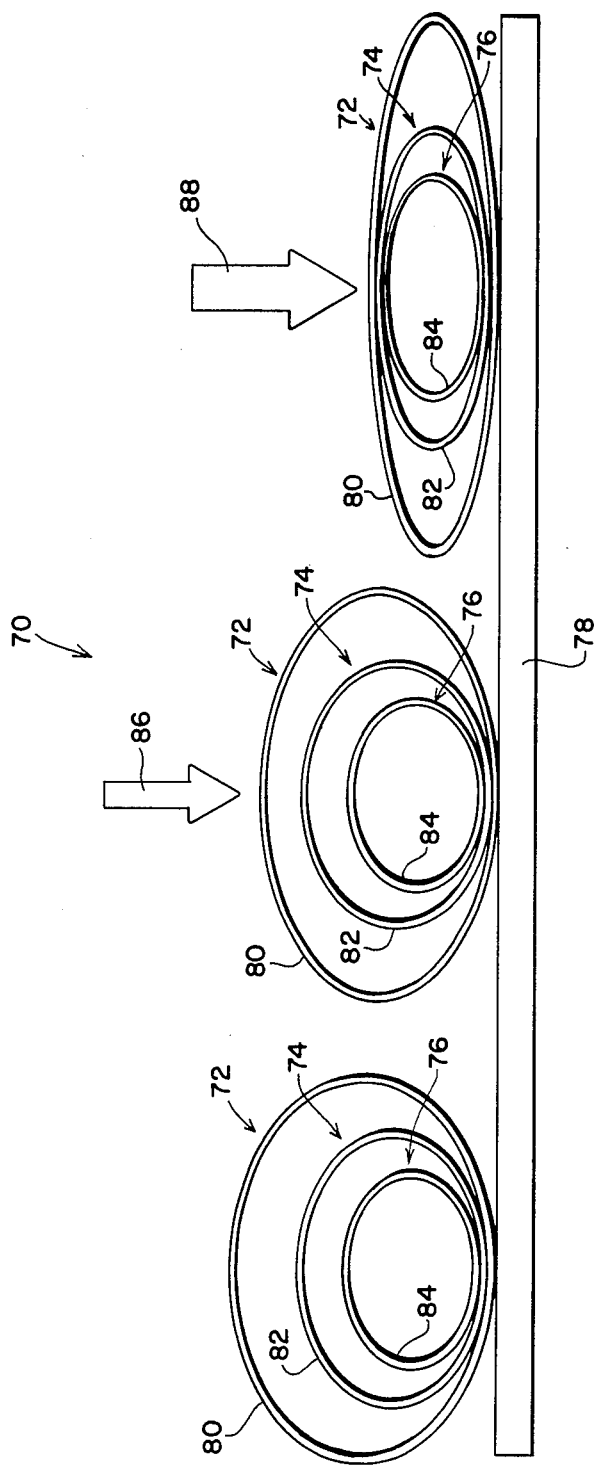
FIG. 6 is an end view of a spring assembly in accordance with the invention, incorporating springs as shown in FIGS. 2-4 and useful for a further understanding of operation of the invention.

FIG. 6 shows another assembly 70 of nested tubes 72, 74 and 76 bonded or attached to a base 78. The tubes 72, 74 and 76 are each cut in the same manner as the FIGS. 2-4 tubes 12 to form a plurality of hoops 80, 82 and 84 in each tube 72, 74 and 76, respectively. The hoops 80, 82 and 84 in the left set of tubes 72, 74 and 76 are in their configuration as formed. Arrows 86 and 88 respectively show the application of increasing downward force on the hoops 80, 82 and 84 of the center set and the right set of the tubes 72, 74 and 76. In the center set, only the largest hoop 80 is being deformed by the downward force. In the right set, the largest hoop 80 has deformed against the middle hoop 82, which has in turn deformed against the smallest hoop 84, which is beginning to deform. Assemblies including a nested plurality of tubes in this manner can be subjected to a much larger range of forces without reaching the limit of their resiliency. In contrast to the prior art spring 13 (FIG. 1), it should be noted that there is no bowing of the hoop springs 80, 82 and 84 at their point of attachment to support 78, even when they have been fully deformed, as in the right hand set.

Figure 7:
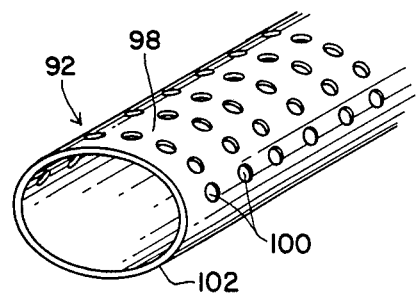
FIG. 7 is a perspective view of a damping member useful in another form of a spring assembly in accordance with the invention.
Figure 8:
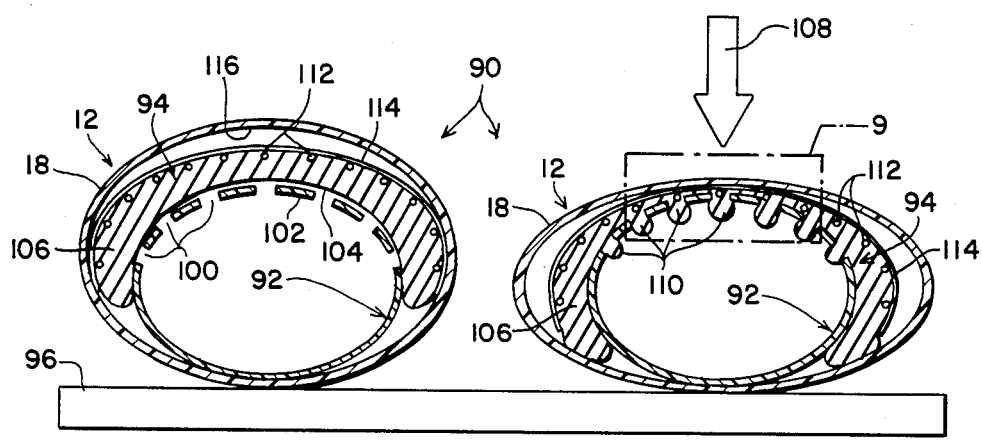
FIG. 8 is an end view of another spring assembly in accordance with the invention, employing the damping member shown in FIG. 7.
Figure 9:
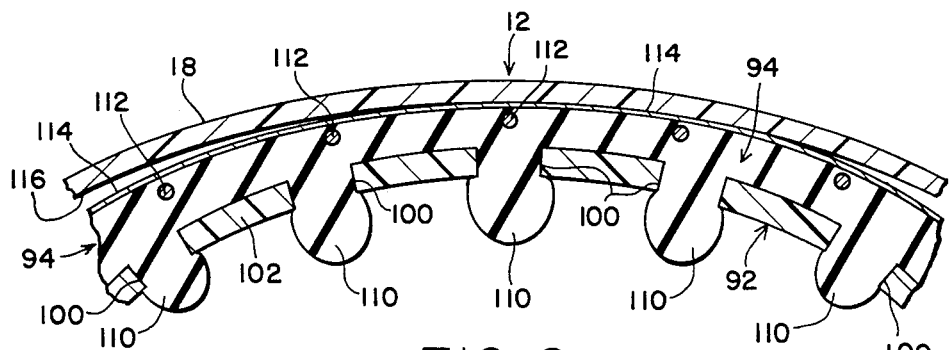
FIG. 9 is an enlarged view of the portion 9 shown in FIG. 8, useful for further understanding of the operation of the FIGS. 7 and 8 assembly embodiment.

FIGS. 7, 8 and 9 show another assembly 90 incorporating tubes 12 as shown in FIGS. 2-4 in combination with a different form of a tube 92 and a channel-shaped resilient elastomeric member 94 between the tubes 12 and the tubes 92. Preferably, resilient member 94 is a visco-elastic material endowed with a characteristic of very low compression set and a very slow recovery from compression, and capable of converting large amounts of kinetic energy to thermal energy. Depending on the factors deemed most important for a given cushion application (cost, weight, elastic properties, flammability, etc.) a visco-elastic material for elastomer 94 may be, for example, selected from the following group: low to high density neoprene (polychloroprene); fluorosililcones, silicones, Fluorel® fluoroelastomer (3M), Kalrez® perfluoroelastomer (duPont), Viton® (duPont), which is a series of fluoroelastomers based on the copolymer of vinylidene fluoride and hexafluoropropylene, a polyester elastomer, HYTREL® from duPont, a variety of fire retarded and combustible visco-elastic polymers manufactured by Sorbothane Inc., Kent, Ohio 44240 and polyisoprene gum. The above described visco-elastic material 94 may be used per se or in conjunction with a skin 114 of a suitably flexible and tough abrasion resistant film, such as those made from polyvinyl chloride or polyvinylidene fluoride. The nested tubes 12 and 92 are bonded or fastened to a suitable base 96, as in the FIG. 6 embodiment. The resilient elastomeric member 94 is then inserted between the tubes 12 and 92 and extends longitudinally along their length. Member 94 may comprise a blend of visco-elastic materials. A plurality of elastomeric members 94 may be employed when there are nested tubes. For example, another elastomer member 94 may be inserted in tube 92.

FIG. 7 shows details of the inner nested tube 92. Upper surface 98 has a plurality of regularly spaced apertures 100 extending through the tube wall 102. When the tubes 12 and 92 are in their nested relationship in assembly 90, the apertures 100 face toward bottom surface 104 of the member 94. Member 94 is formed from a resilient elastomeric material and has a continuous body 106. In FIG. 8, the left set of nested tubes 12 and 92 and member 94 are in their configuration as assembled, with no force applied to them. On the right, when a downward force as represented by arrow 108 is applied to the tube 12, it deforms closer to the the tube 92 in the region 9, squeezing the member 94 between the tubes 12 and 92. With additional downward force, portions 110 of the member 94 extend through the apertures 100 in the tube 92, as best shown in FIG. 9. In this manner, a substantial, sharp downward force applied to the assembly 90 can be damped in an effective manner by the nested tubes 12 and 92 and the member 94. Passengers in speeding aircraft and ground transportation are constantly subjected to undesirable accelerations (such as due to vertical air shear and roadway bumps) for which their seat cushions provide little attenuation. Cushions made in accordance with this invention are capable of providing sufficient shock absorbing or damping to ameliorate these unpleasant effects. FIG. 9 also shows best optional filaments 112 and a comparatively stiff skin 114 provided in and on the member 94 facing inner surface 116 of the tube 12. The filaments 112 extend longitudinally along the member 114. The filaments 112 and skin 114 coact to prevent the member 94 from extending out of slots 20 when the tube 12 is deformed as shown on the right in FIG. 8 and in FIG. 9.

In practice, a series of evaluations of springs in accordance with the invention was carried out. The composite springs were formed from purchased prepregs consisting of graphite or glass fibers in 934 B-stage epoxy resin. The formed spring tubes were heat cured for ½ hour at 135° C., 2 hours at 180° C., slow oven cooling, followed by post cure heating for 2 hours at 200° C. and slow oven cooling. Hoop springs having the configuration of FIGS. 2-4, unidirectional fiber orientations of 0° and 90°, and a fiber content of 60-62% by volume were tested for various mechanical properties using ASTM test methods, with the results shown below in Table I.

TABLE I

| Property | ASTM Method | Graphite/Epoxy | |
| --- | --- | --- | --- |
| | | GY-70/934 | Thornel 300/934 |
| (0°) | | | |
| Tensile Strength | D-3039 | 112 KSI | 218 KSI |
| Tensile Mod. Elas. | D-3039 | 44 MSI | 20 MSI |
| Ult. Ten. Strain | D-3039 | 0.2% | 1.3% |
| Compress. Strength | D-3410 | 96 KSI | 222 KSI |
| Compress. Mod | D-3410 | 44.2 MSI | 19.6 MSI |
| Flex. Strength | D-790 | 112 KSI | 244 KSI |
| Flex. Mod | D-790 | 37 MSI | 155 MSI |
| Interlaminar Shear Strength | D-2344 | 8.6 KSI | 18 KSI |
| (90°) | | | |
| Tensile Strength | D-3039 | 3.2 KSI | 6.4 KSI |

TABLE I-continued

| Property | ASTM Method | Graphite/Epoxy | |
|---|---|---|---|
| | | GY-70/934 | Thornel 300/934 |
| Tensile Mod. Elas. | D-3039 | 0.9 KSI | 1.2 KSI |

Figure 10:
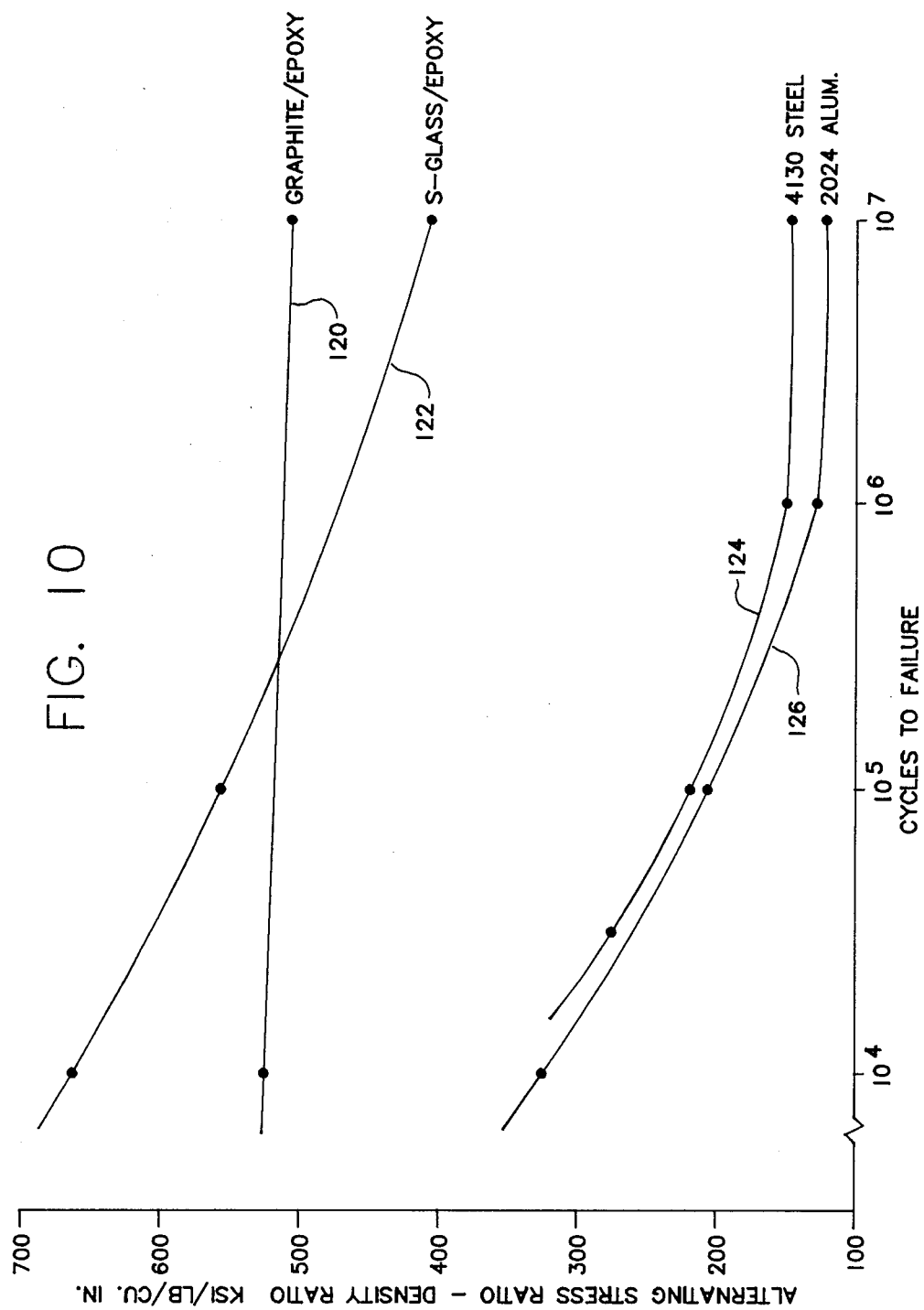
FIG. 10 is a graph showing performance characteristics of springs in accordance with the invention.

FIG. 10 is a plot showing a comparison of elliptical cross section springs as shown in FIGS. 2-4 and fabricated from a graphite/epoxy composite, a glass/epoxy composite (both using the same procedure as for the Table I tests and having a 0° fiber orientation), steel and aluminum, on the basis of stress strength to weight ratio, versus fatigue life. Curve 120 shows an almost linear ability of the graphite/epoxy composition spring to withstand stresses somewhat in excess of a stress/weight ratio of 500 with a total of 10 million stress cycles. Curve 122 shows that the glass/epoxy spring initially will withstand a greater stress/weight ratio than the graphite/epoxy spring, but the ability of the glass/epoxy spring to withstand stress decreases with an increasing number of stress cycles. After 10 million cycles, the ability of the glass/epoxy spring to withstand stress without failure is less than that of the graphite/epoxy spring. Curves 124 and 126 show that springs fabricated from steel and aluminum have a substantially lower initial stress resistance, and that initial stress resistance declines rapidly to very low levels in the case of both metals as the springs are subjected to the stress cycles.

Figure 11:
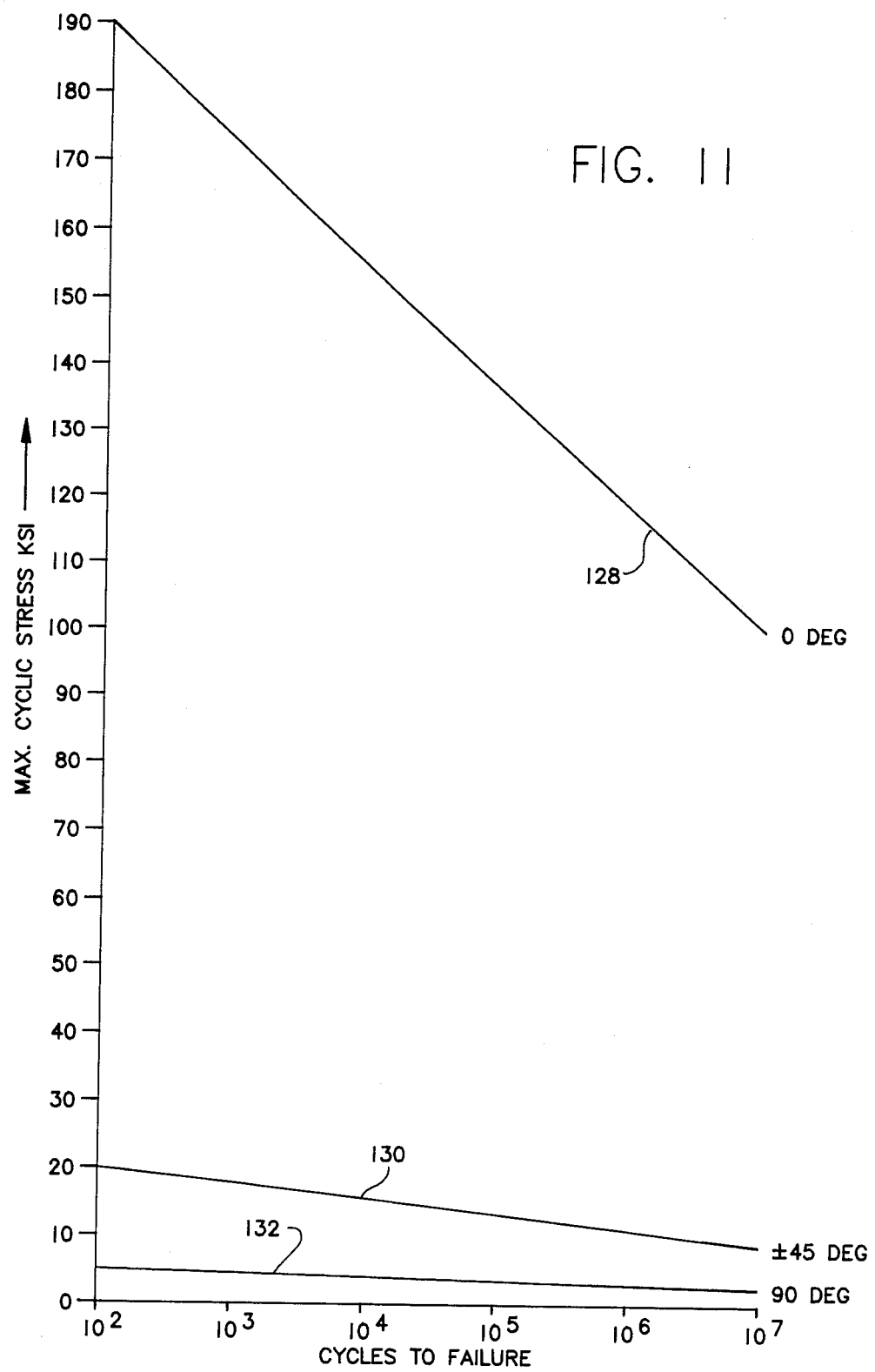
FIG. 11 is another graph showing further performance characteristics of springs in accordance with the invention.

FIG. 11 is a plot showing that the ability of springs formed from a composite material to withstand large stresses is highly dependent on orientation of reinforcing fibers in the composite. The plot shows room temperature (i.e., 25° C.) fatigue properties of a 60-62 volume percent of graphite reinforcing fibers in graphite/epoxy composite springs with different fiber orientation angles with an increasing number of stress cycles. Curve 128 shows that the greatest stress resistance is obtained with a fiber orientation at a 0° angle to a plane normal to the longitudinal axis 16 of the springs, hereinafter called the circumferential plane. Curves 130 and 132 show much less stress resistance when the fibers are oriented at an angle of + or −45° to the circumferential plane of the springs and at a 90° angle thereto, respectively. For the three different fiber orientation angles, 6-ply, 8-ply and 15 ply springs were used for the 0°, + or −45° and 90° orientations, respectively. From the data, the decrease in stress resistance with increasing angle relative to the circumferential plane of the springs was seen to be a cosine function. Accordingly, angles of + or −15° of fiber orientation with respect to the circumferential plane of the springs are acceptable deviations from the 0° orientation in springs fabricated from composite material.

Figure 12:
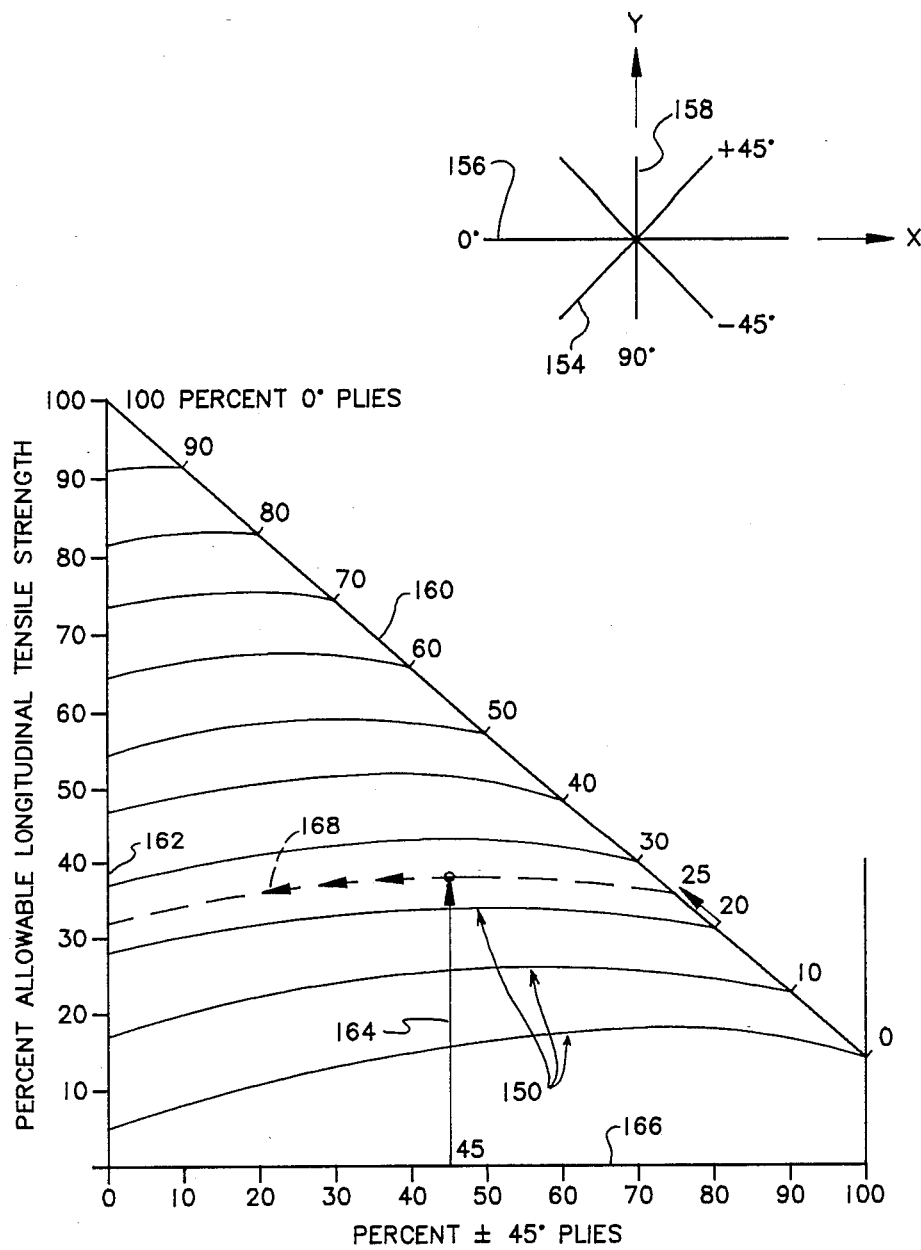
FIG. 12 is a third graph showing further performance characteristics of springs in accordance with the invention.

FIG. 12 shows a family of curves 150 which may be used to evaluate longitudinal tensile strength of graphite/epoxy composite springs incorporating 0°, + or −45° and 90° fiber orientations in a plurality of plies. Key 152 shows the ply orientations relative to the cross section of FIG. 4, and corresponds to the ply orientations as shown in FIG. 2. Line 154 corresponds to the fiber orientation shown at 14 in FIG. 2. Line 156 corresponds to the fiber orientation shown at 14b, and line 158 corresponds to the fiber orientation shown at 14c.

An example will serve to illustrate the use of the curves 150. Assume a hoop spring 18 consisting of composite graphite/epoxy plies with 45% of the graphite fibers at + and −45°, 25% of the plies at 0°, and 30% of the plies at 90°. The 0° fiber orientation gives the greatest hoop strength, but the weakest longitudinal tensile strength. The intersection of line 160, representing the percent of 0° fibers, with the y axis 162 of the plot represents 100% of the 0° fibers, and 100 percent of the allowable longitudinal tensile strength of the spring 18, i.e., the tensile strength along the axis 16 in FIG. 2. To find the percentage of the allowable longitudinal tensile strength of a corresponding force applied to a spring having the fiber orientation mix of the example, line 164 is extended upward from the x axis 166 of the plot (representing the percent of + or −45° orientation fibers) to curve 168, midway between the 20 and 30% 0° fiber curves 150. The curve 168 is then followed to the y axis 162, showing that the spring 18 with the fiber orientation combination of the example has a longitudinal tensile strength such that a longitudinal force equal to 100% of the allowable longitudinal tensile strength of a 100% 0° fiber orientation spring 18 represents only 32% of the allowable longitudinal tensile strength of the example.

Composite graphite/epoxy springs formed from GY-70 graphite/934 epoxy stacked plies having fiber orientations of 0°, +45°, −45°, and 0° and a fiber content of 60-62% were evaluated at room temperature to give the averaged mechanical properties shown below in Table II.

TABLE II

| Property | Value |
|---|---|
| Tensile Strength, KSI | 103 |
| Tensile Modulus, MSI | 44 |
| Flexural Strength, KSI | 209 |
| Compressive Strength, KSI | 96 |
| Interlaminar Shear Strength, KSI (Short Beam) | 7.1 |
| Notch 120D Impact Strength, Ft-lbs/In | 26 |
| Poisson Ratio | 0.180 |
| Specific Gravity | 1.55 (0.056 lb/in$^3$) |

The specific fiber orientations other than 0° employed in the plies of the above examples are representative only, and other angular relationships with respect to the 0° orientation and other combinations of the angularly oriented fiber plies could be employed for the purpose of providing longitudinal strength to the springs.

The spring assemblies of this invention are suited for usage in mattresses and mats, such as exercise mats used in gymnasiums. In these applications, it is not necessary that the spring base be a rigid panel or plate. The tubes may be fastened to a flexible sheet or they may be fastened to the outer sheath of the mattress (the tick) or the mat. The air bag 54 may be dispensed with in applications where flotation properties are not sought.

It should now be readily apparent to those skilled in the art that a novel spring and spring assembly capable of achieving the stated objects of the invention has been provided. The spring of this invention is of simple, one piece construction. Varying performance characteristics can be achieved by varying the spacing between hoops formed from the tube of the spring, varying the width and thickness of the hoop walls, varying the material of construction for the springs, and varying the amount of visco-elastic material between nested tubes. Different combinations of the springs may be employed in spring assemblies that can be employed in a wide variety of use conditions. The characteristics of the springs and the assemblies allows their use to replace polyurethane foam cushions used in conventional vehicle and furniture construction. The assemblies are simpler and easier to fabricate than conventional spring assemblies for vehicle and furniture cushion applications.

It should further be apparent to those skilled in the art that various changes in form and detail of the invention as shown and described may be made. For example, the invention may be used in mattresses, other chairs, sofas, crashworthy seats, and the like. It is intended that such changes be included within the spirit and scope of the claims appended hereto.

I claim:

1. A spring comprising a first tube having a cross section with a laterally extending horizontal axis of greater dimension than a vertical cross section axis of said first tube, with the greater axial dimension extending laterally and the lesser axial dimension extending vertically, a plurality of cuts in the form of slots passing through most of a wall of said first tube extending at an angle to a longitudinal axis extending along said first tube, an uncut portion of said first tube wall extending along said first tube, a second tube nested in said first tube and attached to an inside surface of said first tube, said second tube having a cross section with a laterally extending horizontal axis of greater dimension than a vertical cross section axis of said second tube, with the greater axial dimension extending laterally and the lesser axial dimension extending vertically, said second tube having a plurality of apertures extending through an upper surface of a wall of said second tube, said assembly additionally comprising a resilient, elastomeric, energy absorbing member positioned between said first tube and the upper surface of said second tube.

2. The assembly of claim 1 in which said resilient, energy absorbing member has a plurality of stiffening filaments extending longitudinally along said member.

3. The assembly of claim 1 in which said resilient, energy absorbing member has a stiffening skin facing said first tube. having a plurality of apertures extending through an upper surface of a wall of said second tube, said assembly additionally comprising a resilient, elastomeric, energy absorbing member positioned between said first tube and the upper surface of said second tube.

4. A first spring comprising a first tube having a cross section with a laterally extending horizontal axis of greater dimension than a vertical cross section axis of said first tube, with the greater axial dimension extending laterally and the lesser axial dimension extending vertically, a plurality of cuts in the form of slots passing through most of a wall of said first tube extending at an angle to a longitudinal axis extending along said first tube, an uncut portion of said first tube wall extending along said first tube, a base and at least a second spring including a second tube, said second tube having a cross section with a laterally extending horizontal axis of greater dimension than a vertical cross section axis of said second tube, with the greater axial dimension extending laterally and the lesser axial dimension extending vertically, a plurality of cuts in the form of slots passing through most of a wall of said second tube extending at an angle to a longitudinal axis extending along said second tube, an uncut portion of said second tube wall extending along said second tube, said first spring and said second spring being attached to said base in rows, said rows of springs each comprising one of said springs, a resilient elastomeric tube nested inside said springs, and an inside tube nested inside said resilient elastomeric tube, said inside tube having a plurality of apertures facing said elastomeric tube, such that application of force to said springs deforms portions of said resilient elastomeric tube through the apertures in said inside tube.

5. A first spring comprising a first tube having a cross section with a laterally extending horizontal axis of greater dimension than a vertical cross section axis of said first tube, with the greater axial dimension extending laterally and the lesser axial dimension extending vertically, a plurality of cuts in the form of slots passing through most of a wall of said first tube extending at an angle to a longitudinal axis extending along said first tube, an uncut portion of said first tube wall extending along said first tube, a base and at least a second spring including a second tube, said second tube having a cross section with a laterally extending horizontal axis of greater dimension than a vertical cross section axis of said second tube, with the greater axial dimension extending laterally and the lesser axial dimension extending vertically, a plurality of cuts in the form of slots passing through most of a wall of said second tube extending at an angle to a longitudinal axis extending along said second tube, an uncut portion of said second tube wall extending along said second tube, said first spring and said second spring being attached to said base in rows, at least a second assembly comprising a second base and third and fourth springs including third and fourth tubes, said third and fourth tubes having a cross section with a laterally extending horizontal axis of greater dimension than a vertical cross section axis of said third and fourth tubes, with the greater axial dimension extending laterally and the lesser axial dimension extending vertically, a plurality of cuts in the form of slots passing through most of a wall of said third and fourth tubes extending at an angle to a longitudinal axis extending along said third and fourth tubes, an uncut portion of said third and fourth tubes wall extending along said third and fourth tubes, said third and fourth springs being attached to said second base in rows, said assemblies forming a seat and having said springs configured to provide differing resilient support in different parts of said seat.

6. A first spring comprising a first tube having a cross section with a laterally extending horizontal axis of greater dimension than a vertical cross section axis of said first tube, with the greater axial dimension extending laterally and the lesser axial dimension extending vertically, a plurality of cuts in the form of slots passing through most of a wall of said first tube extending at an angle to a longitudinal axis extending along said first tube, an uncut portion of said first tube wall extending along said first tube, a base and at least a second spring including a second tube, said second tube having a cross section with a laterally extending horizontal axis of greater dimension than a vertical cross section axis of said second tube, with the greater axial dimension extending laterally and the lesser axial dimension extending vertically, a plurality of cuts in the form of slots passing through most of a wall of said second tube extending at an angle to a longitudinal axis extending along said second tube, an uncut portion of said second tube wall extending along said second tube, said first spring and said second spring being attached to said base in rows, said base comprising a bottom of a cushion, an air bag enclosing said springs, a cushioning layer over said air bag, a fire blocking layer over said cushioning layer and an uphostery fabric over said fire blocking layer.

7. The cushion of claim 6 and at least one arm forming part of a seat, said arm comprising a second assembly having a second base and third and fourth springs including third and fourth tubes, said third and fourth tubes having a cross section with a laterally extending horizontal axis of greater dimension than a vertical cross section axis of said third and fourth tubes, with the greater axial dimension extending laterally and the lesser axial dimension extending vertically, a plurality of cuts in the form of slots passing through most of a wall of said third and fourth tubes extending at an angle to a longitudinal axis extending along said third and fourth tubes, an uncut portion of said third and fourth tubes wall extending along said third and fourth tubes, said third and fourth springs being attached to said second base in rows.

8. The seat of claim 22 additionally comprising a back comprising a third assembly having a third base and fifth and sixth springs including fifth and sixth tubes, said fifth and sixth tubes having a cross section with a laterally extending horizontal axis of greater dimension than a vertical cross section axis of said fifth and sixth tubes, with the greater axial dimension extending laterally and the lesser axial dimension extending vertically, a plurality of cuts in the form of slots passing through most of a wall of said fifth and sixth tubes extending at an angle to a longitudinal axis extending along said fifth and sixth tubes, an uncut portion of said fifth and sixth tubes wall extending along said fifth and sixth tubes, said fifth and sixth springs being attached to said third base in rows, said arm assembly being configured to support a load less than said cushion assembly and said back assembly being configured to support a load intermediate to the loads of said cushion assembly and said back assembly.

* * * * *